US011328715B2

(12) United States Patent
Quemy et al.

(10) Patent No.: US 11,328,715 B2
(45) Date of Patent: May 10, 2022

(54) AUTOMATIC ASSIGNMENT OF COOPERATIVE PLATFORM TASKS

(71) Applicant: INTERNATIONAL BUSINESS MACHINES CORPORATION, Armonk, NY (US)

(72) Inventors: Alexandre Quemy, Cracow (PL); Umit Bektas, Cracow (PL); Adam Nowotarski, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 472 days.

(21) Appl. No.: 16/579,969

(22) Filed: Sep. 24, 2019

(65) Prior Publication Data

US 2021/0090556 A1 Mar. 25, 2021

(51) Int. Cl.
*G10L 15/00* (2013.01)
*G10L 15/18* (2013.01)
(Continued)

(52) U.S. Cl.
CPC ............ *G10L 15/197* (2013.01); *G06F 40/40* (2020.01); *G06Q 10/06315* (2013.01);
(Continued)

(58) Field of Classification Search
CPC . G06F 40/30; G06F 40/40; G06Q 10/063112; G06Q 10/06315; G06Q 10/06398; G06Q 10/1097; G10L 15/197
(Continued)

(56) References Cited

U.S. PATENT DOCUMENTS 8,504,361 B2 * 8/2013 Collobert .............. G06F 40/284
704/9
9,466,039 B2 * 10/2016 Gatti ..................... G06N 20/10
(Continued)

OTHER PUBLICATIONS

Limeira de Lima Júnior et al., "Automatic assignment of integrators to pull requests: The importance of selecting appropriate attributes", Journal of Systems and Software vol. 144, pp. 181-196, Oct. 2018, 2 pages.
(Continued)

*Primary Examiner* — Khai N. Nguyen
(74) *Attorney, Agent, or Firm* — Maeve Carpenter; Andrew D. Wright; Roberts Calderon Safran & Cole, P.C.

(57) ABSTRACT

Systems and method for automatically assigning cooperative platform tasks to appropriate participants are disclosed. In embodiments, a method includes receiving new task data for a new task posted to a remote server; transforming the new task data by natural language processing to produce transformed new task data; representing the new task as a vector in a vector space based on the transformed new task data, wherein the vector space includes representations of completed tasks, and the completed tasks are associated with respective participants; calculating distances between the new task and the respective completed tasks represented in the vector space; ranking the respective participants based on the distances between the new task and the completed tasks associated with respective participants; determining a select participant of the respective participants to be assigned to the new task based on the ranking; and initiating automatic assignment of the new task to the select participant.

20 Claims, 7 Drawing Sheets

(51) Int. Cl.
*G10L 15/197* (2013.01)
*G06Q 10/06* (2012.01)
*G06Q 10/10* (2012.01)
*G06F 40/40* (2020.01)

(52) U.S. Cl.
CPC ............... *G06Q 10/06398* (2013.01); *G06Q 10/063112* (2013.01); *G06Q 10/1097* (2013.01)

(58) Field of Classification Search
USPC ........................................................ 704/257
See application file for complete search history.

(56) References Cited

U.S. PATENT DOCUMENTS

| | | | | |
|---|---|---|---|---|
| 9,471,887 | B2* | 10/2016 | Shin | G06N 20/00 |
| 10,984,780 | B2* | 4/2021 | Bellegarda | G06N 3/0427 |
| 11,010,563 | B2* | 5/2021 | Yates | G06Q 10/06316 |
| 2009/0210218 | A1* | 8/2009 | Collobert | G06F 40/284 |
| | | | | 704/9 |
| 2015/0032492 | A1* | 1/2015 | Ting | G06Q 10/063112 |
| | | | | 705/7.14 |
| 2016/0019471 | A1* | 1/2016 | Shin | G06N 20/00 |
| | | | | 706/12 |
| 2018/0330305 | A1* | 11/2018 | Hambridge | G06Q 10/06398 |
| 2019/0122159 | A1* | 4/2019 | Zagni | G06F 16/24575 |
| 2019/0355346 | A1* | 11/2019 | Bellegarda | G06F 40/289 |
| 2020/0334520 | A1* | 10/2020 | Chen | G06N 3/088 |
| 2020/0364305 | A1* | 11/2020 | Yates | H04L 51/046 |
| 2021/0049236 | A1* | 2/2021 | Nguyen | G06F 40/205 |
| 2021/0090556 | A1* | 3/2021 | Quemy | G06Q 10/1097 |

OTHER PUBLICATIONS

Anonymous, "Assign pull request reviewers intelligently", https://github.com/imsky/pull-review, accessed Jul. 12, 2019, 6 pages.
Anonymous, "About webhooks", https://help.github.com/en/articles/about-webhooks, accessed Aug. 13, 2019, 1 page.
Mell et al., "The NIST Definition of Cloud Computing", NIST, Special Publication 800-145, Sep. 2011, 7 pages.
Github, "What is GitHub?", https://www.youtube.com/watch?v=w3jLJU7DT5E&feature=youtu.be, YouTube.com, Dec. 19, 2016, 2 pages.

* cited by examiner

US 11,328,715 B2

AUTOMATIC ASSIGNMENT OF COOPERATIVE PLATFORM TASKS

BACKGROUND

Aspects of the present invention relate generally to cooperative development platforms and, more particularly, to automated assignment of new tasks in a cooperative development platform.

Collaborative developing platforms enable cooperative project development and communication with consumers. In one example, a consumer may open a discussion thread or issue on a cooperative development platform to report a software bug, request software features, or ask questions. A participant on the cooperative development platform (e.g., a subject matter expert) may then address or resolve the issue by, for example, making a copy of the software at issue and writing new features for the software at issue. The cooperative development platform may track changes made to the software at issue. The cooperative development platform may also enable a user to open a pull request to share proposed changes with other members of the platform (e.g., teammates). The platform may track contributions from all members and enable users to sink up to a repository to see the changes/edits of others. Project managers may manually assign one or more subject matter experts to newly opened items (e.g., thread or issue) on the platform to enable the subject matter expert(s) to address the item.

SUMMARY

In a first aspect of the invention, there is a computer-implemented method including receiving, by a computing device, new task data for a new task posted to a remote server, via a network; transforming, by the computing device, the new task data by natural language processing to produce transformed new task data; representing, by the computing device, the new task as a vector in a vector space based on the transformed new task data, wherein the vector space includes representations of completed tasks, and the completed tasks are associated with respective participants; calculating, by the computing device, distances between the new task and the respective completed tasks represented in the vector space; ranking, by the computing device, the respective participants based on the distances between the new task and the completed tasks associated with respective participants; determining, by the computing device, a select participant of the respective participants to be assigned to the new task based on the ranking; and initiating, by the computing device, automatic assignment of the new task to the select participant.

In another aspect of the invention, there is a computer program product including a computer readable storage medium having program instructions embodied therewith. The program instructions are executable by a computing device to cause the computing device to receive new task data for a new task posted to a remote cooperative development server, via a network; transform the new task data utilizing natural language processing to produce transformed new task data; represent the new task as a vector in a vector space based on the transformed new task data, wherein the vector space includes representations of completed tasks, and the completed tasks are associated with respective participants; calculate similarities between the new task and the respective completed tasks represented in the vector space; rank the respective participants based on the similarities between the new task and the completed tasks associated with respective participants and a predetermined function; determine a select participant of the respective participants to be assigned to the new task based on the ranking; and initiate automatic assignment of the new task to the select participant.

In another aspect of the invention, there is system including a processor, a computer readable memory, and a computer readable storage medium. The system includes program instructions to automatically receive new task data for a new task posted to a remote cooperative development server, via a network; program instructions to transform the new task data utilizing natural language processing to produce transformed new task data; program instructions to represent the new task as a vector in a vector space based on the transformed new task data, wherein the vector space includes representations of completed tasks, and the completed tasks are associated with respective participants; program instructions to obtain a number of open tasks assigned to the respective participants from the cooperative development server via the network; program instructions to calculate similarities between the new task and the respective completed tasks represented in the vector space; program instructions to rank the respective participants based on the similarities between the new task and the completed tasks associated with respective participants and the number of open tasks assigned to the respective participants; program instructions to determine a select participant of the respective participants to be assigned to the new task based on the ranking; and program instructions to initiate automatic assignment of the new task to the select participant. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
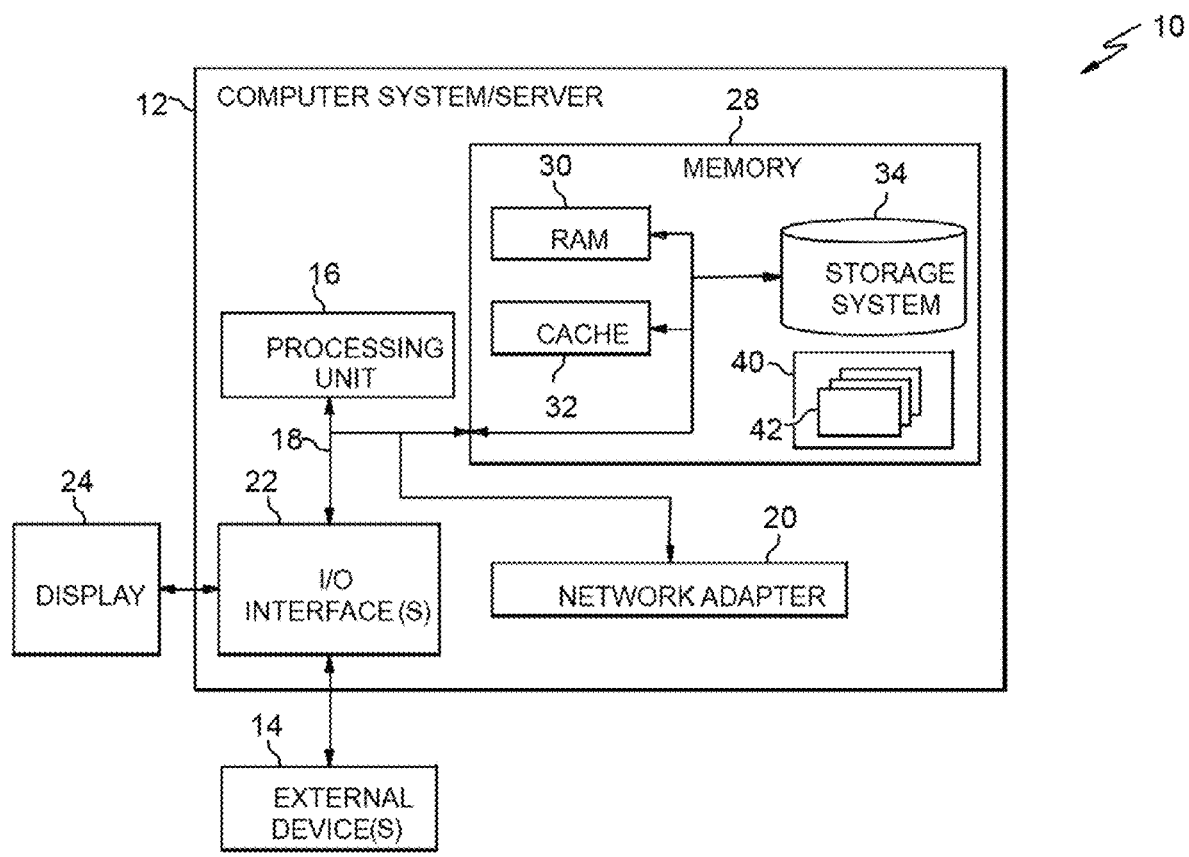
FIG. 1 depicts a cloud computing node according to an embodiment of the present invention.

Aspects of the present invention relate generally to cooperative development platforms and, more particularly, to automated task assignment of new tasks in a cooperative development platform. In embodiments, a method is provided for automatically assigning tasks to participants in order to solve dysfunctionalities or implement enhancements of a computing system, including: receiving an incoming new task; automatically analyzing the incoming new task with natural language processing; representing the incoming new task as a vector associated to the incoming new task based on the outcome of the analyzing; using the vector representation of completed tasks to calculate the distance to a new task vector; ranking participants (persons) based on the distances of their previous tasks to the new task according to a predefined function; selecting the participant with the highest score; assigning the incoming new task to the selected participant; and storing the incoming new task with its calculated vector value.

Collaborative developing platforms such as the collaborative software development platform GitHub® by GitHub, Inc., enable cooperative development of projects and communication with consumers. In the example of GitHub®, a consumer may open a discussion thread or issue on the platform to report a bug, request software features, or ask questions, for example. A user (e.g., software engineer) may then address the issue by, for example, making a copy of the software at issue and writing new features for the software at issue. The platform tracks changes made to the software at issue. The platform further enables a user to open a pull request to share proposed changes with other members of the platform (e.g., teammates). The platform tracks contributions from the other members and enables users to sink up to a repository to see the changes/edits of others. Webhooks provide a way for notifications to be delivered to an external web server whenever certain actions occur on a repository or for an organization.

Presently, cooperative development platforms do not enable automatic assignment of newly opened items to appropriate participants (e.g., subject matter experts, such as a software engineer). Manual assignment (e.g., by a project manager) of an appropriate participant to a newly opened discussion thread or issue can create delays, sometimes of several days, between when an item is opened and the moment it is assigned to the user, which can delay delivery of answers to customers. Moreover, people within a team may know the area of expertise of each member of their team such that they can reasonably assign the best person for a particular task they open/post in the cooperative development platform. However, external persons (e.g., support personnel, an engineer from another team, or a direct customer) may not know the areas of expertise of team members and will often assign someone based on the title and description of the task only.

Advantageously, embodiments of the invention provide a technical solution to the technical problem of automating an assignment of newly opened tasks within a computing system to appropriate participants (e.g., subject matter experts) based on new task data. Implementations of the invention provide improvements to the function of collaborative development platforms and to the technical field of cloud-based collaborative work environments. In aspects data for a newly entered item (e.g., task) in a collaborative development platform is transformed into new data, the item is represented in a vector space, and an analysis of the vector space is performed to select an appropriate subject matter expert to automatically assign to the task.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
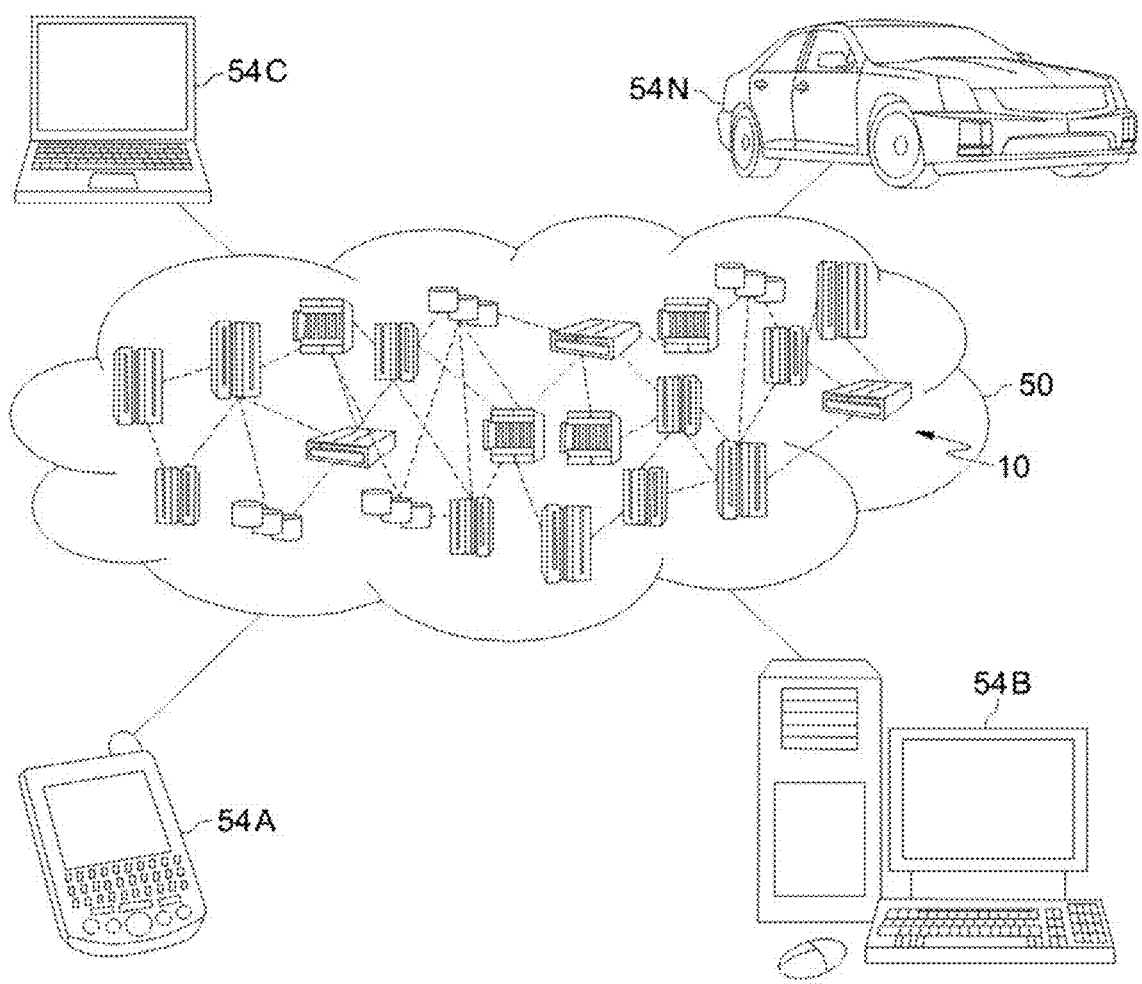
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
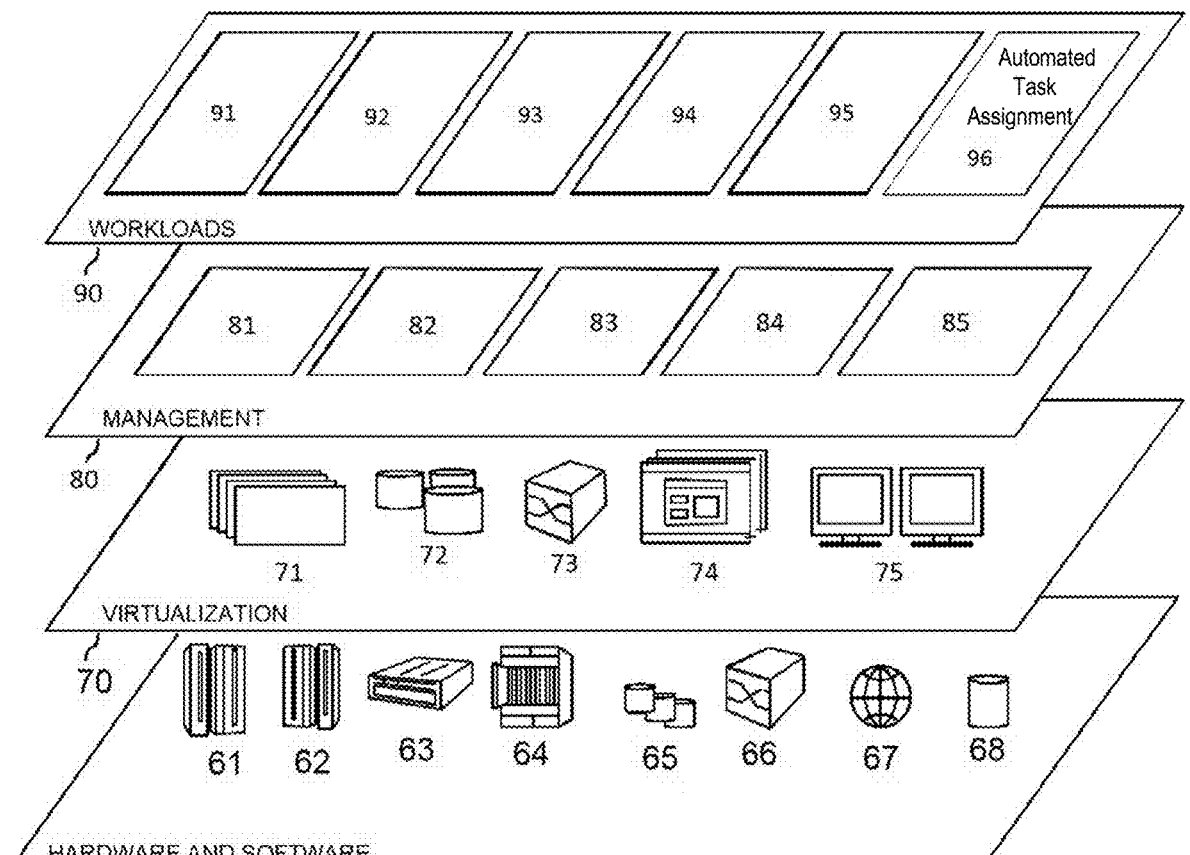
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated task assignment 96.

Implementations of the invention may include a computer system/server 12 of FIG. 1 in which one or more of the program modules 42 are configured to perform (or cause the computer system/server 12 to perform) one of more functions of the automated task assignment 96 of FIG. 3. For example, the one or more of the program modules 42 may be configured to: receive an incoming new task from a cooperative development server; analyze the incoming new task with automatic natural language processing; represent the incoming task as a vector associated to the incoming new task based on the outcome of the natural language processing; use the vector representation of stored completed tasks to calculate the distance to the new task vector; rank persons based on the distances of their previous tasks to the new task according to a predefined function (e.g., averaging function); select the person with the highest score; assign the incoming new task to the selected person; and store the incoming new task with its calculated vector value.

Figure 4:
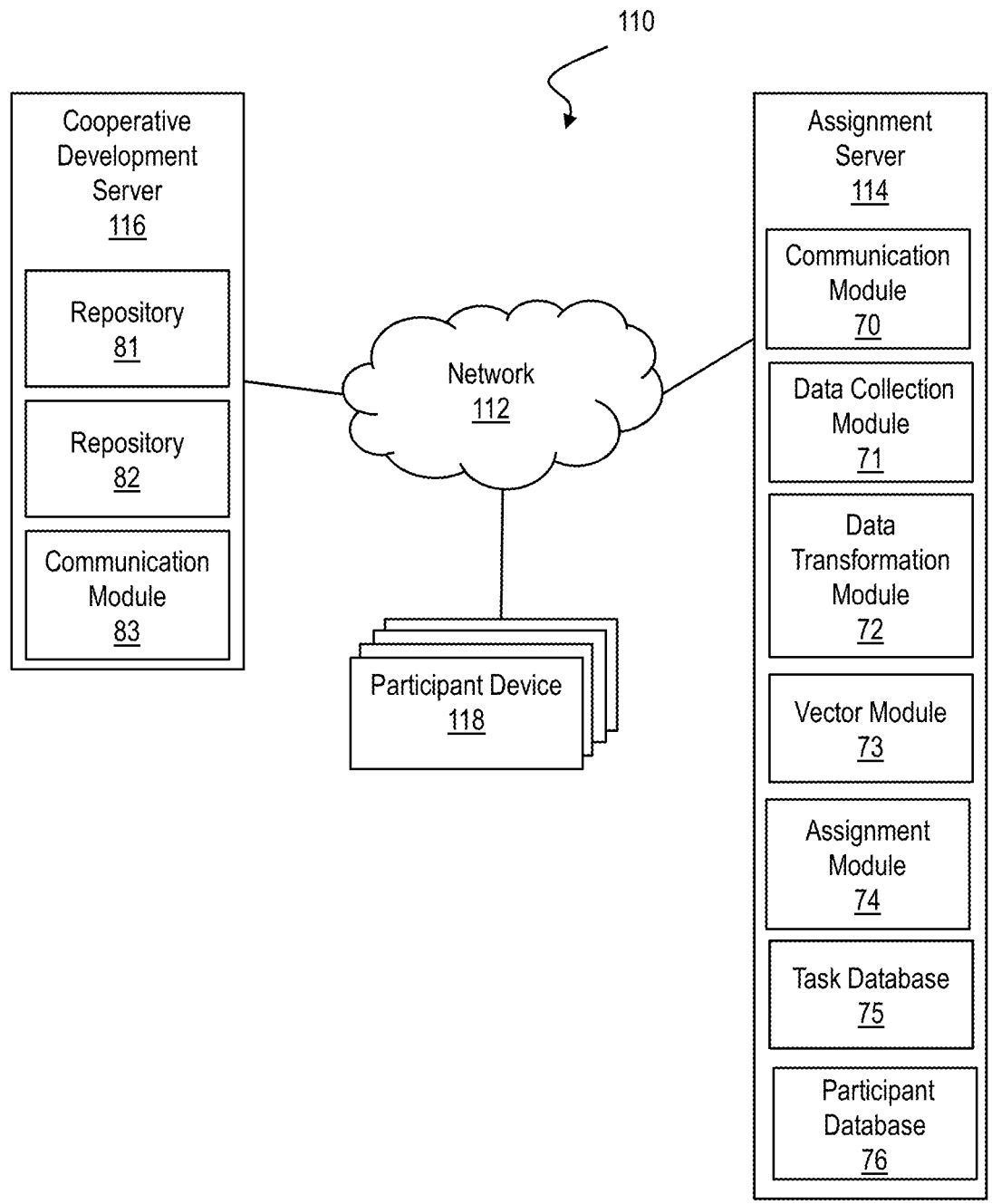
FIG. 4 shows a block diagram of an exemplary environment in accordance with an embodiment of the invention.

FIG. 4 shows a block diagram of an exemplary environment 110 in accordance with aspects of the invention. In embodiments, the environment 110 includes a network 112 interconnecting an assignment server 114 with a cooperative development server 116 and a plurality of participant devices 118. In implementations, the environment 110 comprises the cloud computing environment 50 of FIG. 2, wherein the assignment server 114, cooperative development server 116 and participant devices 118 are nodes 10 in the cloud computing environment 50.

The assignment server 114 may be configured as a special purpose computing device that is part of a cooperative development environment. For example, the assignment server 114 may be configured to provide automatic task assignment for one or more cooperative development servers 116, to assign tasks to users of the participant devices 118. The cooperative development server 116 may be configured as a special purpose computing device that provides cooperative project development functions to users of the participant devices 118 through a cooperative development platform. For example, the cooperative development server 116 may be a server providing cooperative software development functions to users of the participant devices 118 in a cloud environment. The assignment server 114 and the cooperative development server 116 may each comprise elements of the computer system 12 and may be connected to the network 112 via a network adaptor (e.g., network adapter 20 of FIG. 1).

The network 112 may be any suitable communication network or combination of networks, such as a local area network (LAN), a general wide area network (WAN), and/or a public network (e.g., the Internet). The participant devices 118 may be in the form of the computing device 12 of FIG. 1, and may be a desktop computer, laptop computer, tablet computer, smartphone, etc. In embodiments, the participant devices 118 run one or more application programs that provide an interface by which a user may enter data to be submitted to the cooperative development server 116 and/or the assignment server 114.

Still referring to FIG. 4, the cooperative development server 116 and the assignment server 114 may each include one or more program modules configured to perform one or more functions described herein. In embodiments, the assignment server 114 comprises one or more of: a communication module 70, a data collection module 71, a data transformation module 72, a vector module 73, an assignment module 74, a task database 75 and a participant database 76.

In implementations, the communication module 70 is configured to enable communication between the cooperative development server 116 and the assignment server 114 and/or between the assignment server 114 and the participant devices 118. In implementations, the data collection module 71 is configured to obtain new task data (open task data) from the cooperative development server 116. In aspects, the data collection module 71 is configured to obtain historic user interaction data (e.g., data regarding closed tasks) from the cooperative development server 116 for storage in the task database 75 and/or participant database 76.

In embodiments, the data transformation module 72 is configured to analyze and transform data associated with a new task or item posted on a cooperative development platform (of the cooperative development server 116) for use by the vector module 73. In implementations, the vector module 73 is configured to represent the new task or item in a vector space based on the analyses by the data transformation module 72, as well as prior tasks based on the historic user interaction data. In embodiments, the assignment module 74 is configured to automatically assign a user (e.g., from the participant database 76) to the new task or item based on distance and similarity calculations utilizing the vector space.

In embodiments, the cooperative development server 116 is configured to enable the establishment of repositories (e.g., repository 81, repository 82) by users, which provide central locations for data storage for respective projects within a cooperative development platform hosted by the cooperative development server 116. In aspects, a communication module 83 enables users of participant devices 118 to access one or more repositories 81, 82 of the cooperative development server 116, and provide the users with shared data from other users on the cooperative development platform. In aspects, the communication module 83 is configured to collect user interaction data from the cooperative development platform to share with the assignment server 114, such as through an application programming interface (API).

In embodiments, the assignment server 114 and the cooperative development server 116 may each include additional or fewer components than those shown in FIG. 4. In embodiments, separate components may be integrated into a single computing component or module. Additionally, or alternatively, a single component may be implemented as multiple computing components or modules. Moreover, the quantity of devices and/or networks in the environment 110 is not limited to what is shown in FIG. 4. In practice, the environment 110 may include additional devices and/or networks; fewer devices and/or networks; different devices and/or networks; or differently arranged devices and/or networks than illustrated in FIG. 4. Devices of the environment 110 may interconnect via wired connections, wireless connections, or a combination of wired and wireless connections.

Figure 5:
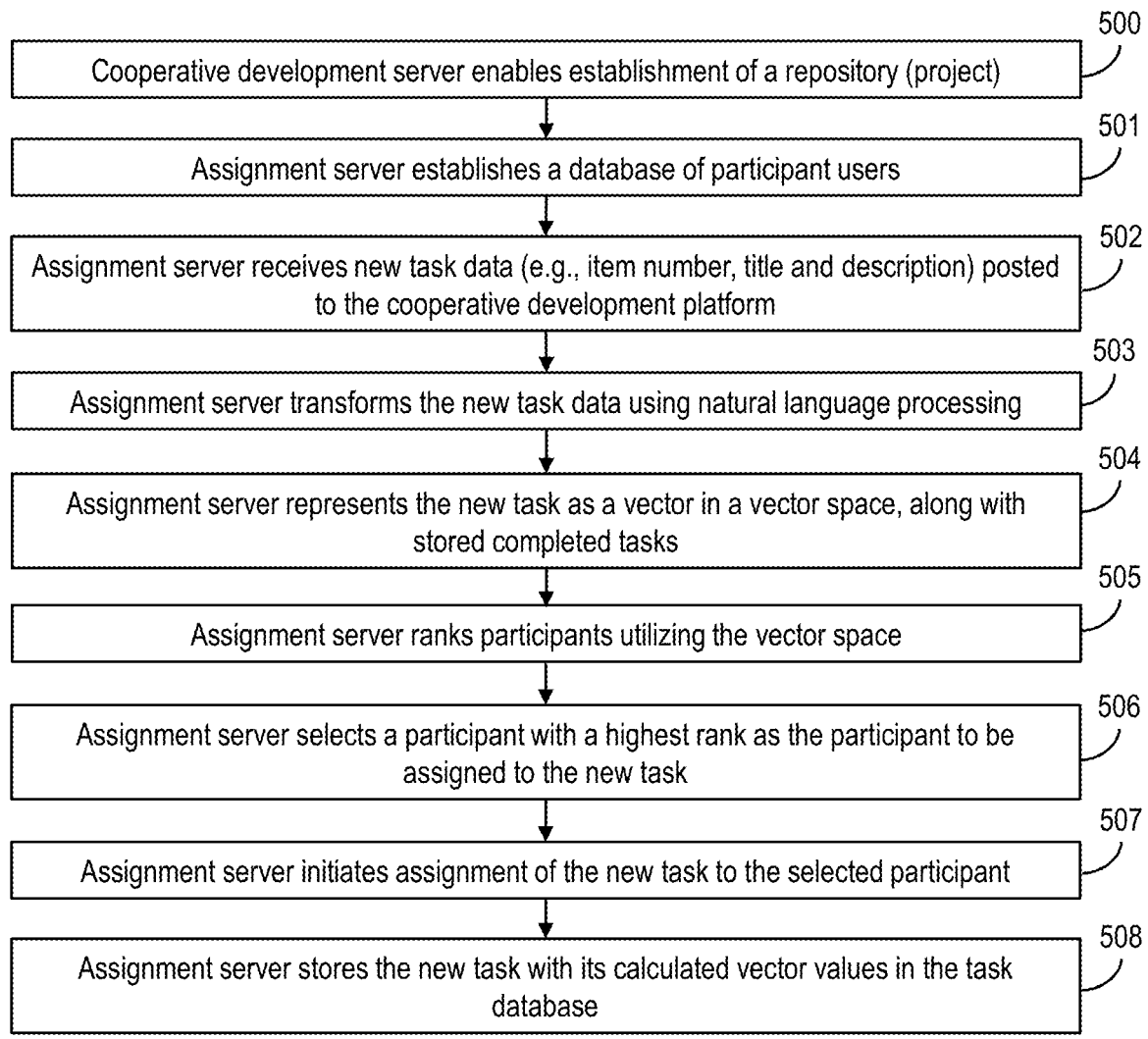
FIG. 5 shows a flowchart of an exemplary method in accordance with an embodiment of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the cooperative development server 116 enables the establishment of a repository (e.g. a central location data is stored) for a project within a cooperative development platform hosted by the cooperative development server 116. In embodiments, the cooperative development platform is a cooperative software development platform enabling multiple authorized users to access one or more repositories (e.g., repository 81, repository 82) and share data. One example of such a cooperative development platform is GitHub® by GitHub, Inc., which provides hosting for software development version control. In implementations, the communication module 83 enables a user (e.g., a project manager) to establish a repository 81 for a cooperative development project, such as a project to update/revise a distributed business software. In general, the cooperative development platform enables authorized participants to post new tasks (open tasks) in one or more repositories. For example, a new task may be generated when a quality assurance (QA) tool or administrator detects a bug or regression in a software product after a pull request is merged, a support engineer may translate what they analyzed from a pull request merge as a task, a project owner may post a request or enhancement as a task, or an engineer from a different team (e.g., repository) may report a software integration problem or ask for a feature request. The cooperative development platform further enables a user to assign tasks to participants, whereby the participants can address/complete the task, resulting in a closed task. In accordance with embodiments of the present invention, the assignment server 114 communicates assignments to the cooperative development platform, wherein the assignment of tasks is performed automatically to appropriate participants in the manner described below.

At step 501, the assignment server 114 establishes a participant database 78 of participant information. In one example, the participant database 78 records a number of different types of user data including, user identification data, repositories for which the user is authorized to access, projects associated with the user, subject matter expertise of the user, etc. In embodiments, the assignment server 114 obtains participant information from the cooperative development server 116, such as through the communication module 83 (e.g., an API of the communication module 83). Participant information in the participant database 78 may be automatically input into the participant database 78 (e.g., by the communication module 70) and/or may be manually input by an administrator.

At step 502, the assignment server 114 receives task data for new tasks (open tasks) posted to the cooperative development platform hosted by the cooperative development server 116. The term new task as used herein refers to an open item that is intended to be addressed by a participant of the cooperative development platform, such as a report of a software bug, a request for software features/updates, or a question asked. In embodiments, the new task data includes one or more of: a task identifier (e.g., item number), a title, and a description of the task. In embodiments, a participant in the cooperative development platform posts a new task to the cooperative development server 116 (e.g., via a participant device 118), and the communications module 70 of the assignment server 114 automatically receives the incoming new task from the communication module 83 of the cooperative development server 116 upon the cooperative development server 116 receiving the post. In embodiments, a project administrator (e.g., via a participant device 118) establishes a webhook (i.e., a web callback or HTTP push API) for a particular project (e.g., repository 81) in the cooperative development platform, which causes new tasks (new task data) posted to the cooperative development platform to be automatically provided to the assignment server 114 in real-time or near real-time. In one example, an administrator of the repository 81 sets a webhook to return new tasks posted to the cooperative development platform to a Representational State Transfer (REST) API of a small script hosted in the assignment server 114 in real-time, wherein the new tasks each include an item number, title and description. In embodiments, the communication module 70 of the assignment server 114 implements step 502.

At step 503, the assignment server 114 transforms the new task data received at step 502 using natural language processing (NLP) techniques to produce transformed task data.

In aspects, the new task data is in the form of text data, or is transformed into text data at the assignment server 114 (e.g., utilizing speech-to-text techniques). In implementations, the transformation of the new task data includes pre-processing the data to "clean" the data and a term frequency-inverse document frequency (TFIDF) transformation of the data. In embodiments, the following NLP techniques are utilized to pre-process the incoming new task data: tokenization; part-of-speech (PoS) tagging; lemmatization; stop words removal; and n-gram computation for n from 1 to 4. In embodiments, a TFIDF transformation is applied to the pre-processed new task data to adjust the importance of each word with regards to their frequency within a document and the associated whole corpus and produce the transformed task data. In embodiments, the data transformation module 72 of the assignment server 114 implements step 503.

A variety of NLP tools and methods may be utilized in the implementation of the above NLP techniques. The term tokenization as used herein refers to the process of demarcating, and optionally classifying, sections of a string of input characters in the context of a lexical analysis. The term PoS tagging (grammatical tagging or word-category disambiguation) as used herein refers to the process of marking up a word in a text as corresponding to a particular part of speech based on both its definition and its context. The term lemmatization as used herein refers to the process of grouping together the inflected forms of a word so that they can be analyzed as a single item identified by the word's dictionary form or lemma. In general, stop words are words which are filtered out before processing natural language data to prevent problems created by the words, and may be selected based on the nature of the cooperative development platform, project or repository, for example. Stop words may also be selected based on the language itself. For example, many short words such as "a", "the" and other prepositions such as "to" and "at" do not carry any semantic information and are thus removed to improve the overall performance of text analysis. The term n-gram as used herein refers to a contiguous sequence of n items for a given sample of text or speech in the field of computational linguistics and probability. The term TFIDF as used herein refers to a numerical statistic that is intended to reflect how important a word is to a document in a collection or corpus.

At step 504, the assignment server 114 represents the new task in a vector space based on the transformed task data of step 503. The term vector space as used herein refers to a collection of objects called vectors, which may be added together and multiplied (scaled) by numbers called scalers. In implementations, the new task is represented in the vector space with completed tasks (closed tasks) to enable distance and similarity calculations to be performed. In implementations, the assignment server 114 obtains completed task data from the task database 75 for use in generating vectors in the vector space. In embodiments, the completed task data comprises previously posted (historic) task data transformed according to step 503 and stored in the task database 75 with participant data (e.g., a subject matter expert assigned to each task). In implementations, the assignment server 114 automatically obtains the completed task data from the cooperative development server 116, either periodically or continuously, and stores the completed task data in the task database 75. In embodiments, the vector module 73 of the assignment server 114 implements step 504.

At step 505, the assignment server 114 ranks participants utilizing the vector space. In implementations, the assignment server 114 calculates a distance between vector representations of completed tasks and the new task. In aspects, every completed task is labeled with a certain participant (e.g., subject matter expert) who was assigned to, addressed or resolved the task. For example, completed task data in the task database 75 may be stored with assignment data listing the participant(s) assigned to the task. In embodiments, the assignment server 114 utilizes the following cosine similarity function to determine the rank of respective participants assigned to completed tasks, where A and B are vectors of attributes, cosine similarity is $\cos(\theta)$, and $A_i$ and $B_i$ are components of vector A and B respectively:

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}},$$

In implementations, the assignment server 114 assigns a score to each participant (participants associated with completed tasks) by summing the distance between the new task and the completed task associated with the participant. In embodiments, the assignment server 114 ranks the participants based on the distances of their completed tasks to the new task according to a predetermined function. The predetermined function may be determined by an administrator. In embodiments, the predetermined function is a normalization function. In embodiments, the predetermined function is an averaging function. In one example, for each participant the assignment server 114 sums the difference of all the tasks he or she was assigned in the past and determines the smallest distance on average (i.e. most similar). In implementations, the participant that, on average, took care of completed tasks most similar to the new task is automatically assigned by the assignment server 114 to the new task.

It is possible to control the behavior of the task assignment model utilized by the assignment server 114 by adjusting the ranking procedure. In practice, new tasks are usually divided between team members rather than assigned to a single person even if the person is the subject matter expert on all the new tasks currently opened. To address this issue, the assignment server 114 can access (e.g., through a cooperative development platform API) a number of currently assigned tasks to a given participant and modulate the participant's score/rank based thereon. For example, a participant who is not available due to the number of currently assigned tasks would be assigned a 0 multiplier such that no task can be assigned to him/her by the assignment server 114, while a person without any assigned tasks would be assigned a multiplier equal to 1. In implementations, depending on a participant's average velocity and number of assigned defects, the multiplier ranges between 0 and 1. Thus, in embodiments of the invention, the assignment server 114 adjusts the rankings of participants based on predetermined rules (e.g., unavailable participants assigned 0 multiplier) to ensure distribution of new tasks amongst a group of participants.

Moreover, the ranking of participants by the assignment server 114 may result in a higher rank/score for the most active participant since the sum of numerous tasks with small similarity scores may be larger than a few tasks with large similarity scores. In certain embodiments, to mitigate this bias, the assignment server 114 normalizes the scores by the respective number of contributions per participant. In implementations, for each participant who has contributed to a repository (e.g., repository 81), a list of completed tasks that he/she has solved (addressed) is stored in the task database 75 and/or participant database 76. In one exemplary scenario, the assignment server 114 uses a k-Nearest Neighbor (kNN) algorithm to select the k closest issues (completed tasks) from the new task to be assigned. The assignment server 114 then calculates a score for each completed task (contribution) as follows. The assignment server 114 sums a distance between the new task to be assigned and the completed tasks the participant solved among the K closest issues to obtain a score. The assignment server 114 then divides the score by the ratio between the number of completed tasks the participant solved among the k closest issues and k. Utilizing this exemplary scoring method, the assignment server 114 is able to take into account that some participants/contributors solved more issues in the past, and thus is able to avoid assigning new tasks only to those participants/contributors. The assignment server 114 is left with the choice of k that has a value from 1 up to the number of tasks K. In implementations, an administrator sets a value for k for use by the assignment server 114 in determining participant scores/ranks with respect to a new task to be assigned.

For the sake of discussion, if k=1, then the assignment server 114 would look for the closest completed task, determine the participant who solved/addressed the completed task, and assign the new task to that participant. If k=K, then the assignment server 114 would consider all past completed tasks at the same time, even the completed tasks least related to the new task. Neither scenario is ideal. In another example: if k=2, the assignment server 114 would look at the two closest completed tasks. If both completed tasks have been solved by the same participant, this participant would be assigned to the new task by the assignment server 114. If each task was solved by two different participants, the assignment server 114 assigns the new task to the participant that was assigned to the closest completed task.

In embodiments, an administrator defines k using the following 10-folds cross-validation method: (1) the administrator splits the dataset of completed tasks into 10 groups; (2) sets a value for k; (3) utilizes the 9 first folds as a reference set and the last one as a test set; and (4) for each completed task in the test set, the assignment server 114 uses the reference set to determine the participant to assign to the new task. As an administrator knows the participant that actually has been assigned, the administrator can calculate the accuracy of the model (=total correctly assigned/total tasks in the test set). The administrator may then redo the procedure by selecting another fold as a test set until all folds have been used. This results in 10 accuracy measures. The final accuracy associated to this particular value of k is the average over those 10 measures. The administrator may redo this procedure for all possible values of k and set k to the one that returns the highest accuracy for a particular repository, group of participants, or cooperative development platform, for example. In embodiments, the assignment module 74 of the assignment server 114 implements step 505.

At step 506, the assignment server 114 selects a participant with the highest rank as the participant to be assigned to the new task. In embodiments, the assignment module 74 implements step 506.

At step 507, the assignment server 114 automatically initiates the assignment of the new task to the selected participant of step 506. In embodiments, the assignment server 114 automatically communicates the assignment of the new task to the cooperative development server 116 at step 507 (e.g., as a notification). In aspects, assignment module 74 of the assignment server 114 implements step 507. In embodiments, the assignment module 74 causes the communication module 70 of the assignment server 114 to communicate the assignment of the new task to the communication module 83 of the cooperative development server 116 in real-time or near real-time. In embodiments, a notification regarding the assignment of the new task is sent to the participant (e.g., participant device 118) by the assignment server 114, or alternatively, is sent by the cooperative development server 116 based on the cooperative development server 116 receiving the notification of the assignment from the assignment server 114. In one example, a script hosted by the assignment server 114 determines a person to be assigned to the new task, and using a cooperative platform API (e.g., GitHub® API), assigns the new task directly on the cooperative platform such that the person will receive a notification of the assignment from the cooperative platform.

At step 508, the assignment server 114 stores the new task (new task data) with its calculated vector values in the task database 75. In implementations, the assignment of the participant to the new task is recorded in the task database 75 and/or the participant database 76. In aspects, the assignment module 74 of the assignment server 114 implements step 508.

Figure 6:
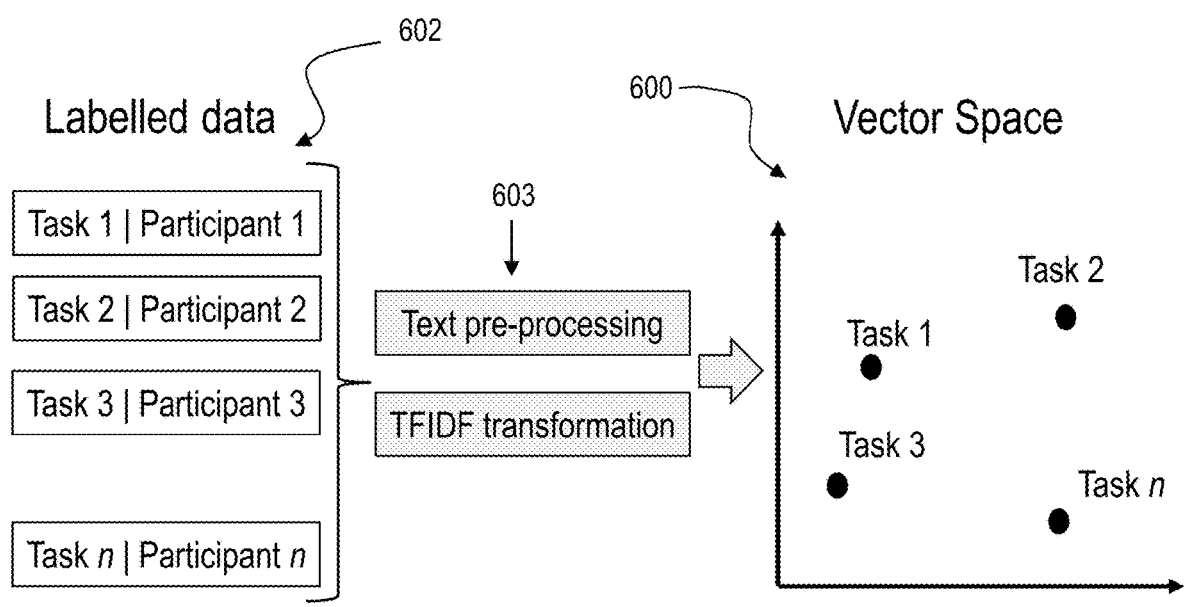
FIG. 6 shows a diagram illustrating the generation of an exemplary vector space in accordance with an embodiments of the invention.

FIG. 6 is a diagram illustrating the generation of an exemplary vector space 600 in accordance with embodiments of the invention. Steps illustrated in FIG. 6 may be carried out in accordance with the method steps of FIG. 5 and in the environment of FIG. 4.

As depicted in FIG. 6, the assignment server 114 generates a vector space 600 including a plurality of stored completed task representations (e.g., tasks 1-n). In the example depicted, the task representations 1-n are generated from labeled data 602 (e.g., from the task database 75). The labeled data 602 includes the completed task performed and a participant assigned to that task (e.g., the participant who completed the task or addressed the task). At 603, the labeled data 602 is shown being transformed using NLP techniques (pre-processing and TFIDF transformation techniques) as set forth in step 503 of FIG. 5.

Figure 7:
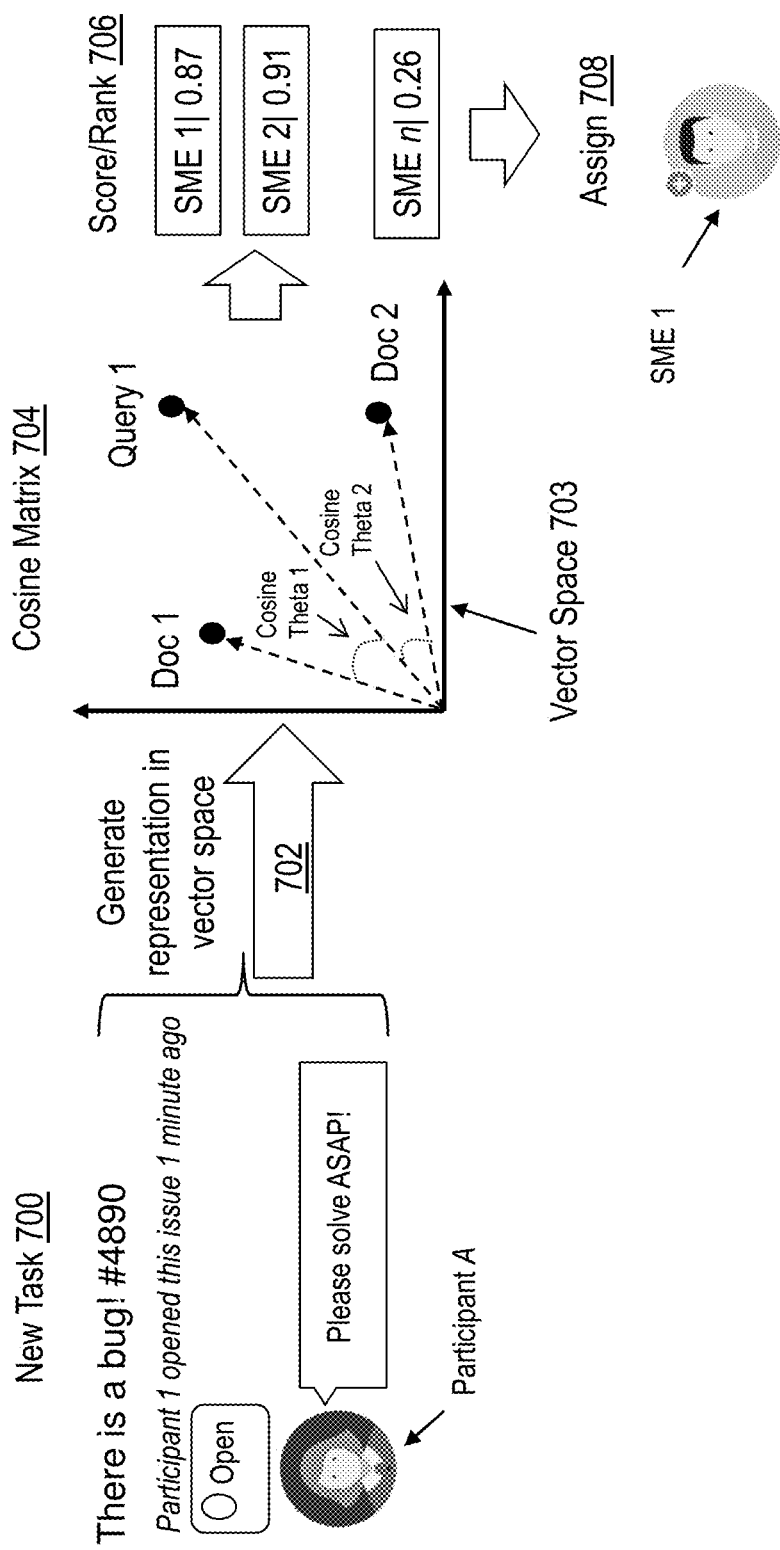
FIG. 7 illustrates an exemplary use scenario in accordance with an embodiments of the invention.

FIG. 7 illustrates an exemplary use scenario according to embodiments of the invention. Steps illustrated in FIG. 7 may be carried out in accordance with the method steps of FIG. 5 and in the environment of FIG. 4.

In the scenario of FIG. 7, a participant A enters a new task 700 into a repository (e.g., repository 81) of a cooperative development platform hosted by the cooperative development server 116 via a user interface of a participant device 118. The new task 700 is automatically sent to the assignment server 114 (e.g., via an API), and the assignment server 114 generates a representation of the new task in the vector space 703 as well as completed tasks performed with respect to the repository 81, to produce the cosine matrix 704. The vector space 703 includes representations of historic tasks posted to the repository 81, represented by Doc 1, Query 1, and Doc 2. The assignment server 114 utilizes the cosine matrix 704 to score and rank subject matter experts (SME 1-SME n) associated with the tasks 1-n at 706. In the scenario shown, the assignment server 114 determines similarity using the cosine similarity function set forth above in the discussion of FIG. 5. In this example, SME 1 has the highest score out of all participants at 0.87, and the assignment server 114 thus automatically assigns SME 1 to the new task 700.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computing device, new task data for a new task posted to a remote server, via a network;
   transforming, by the computing device, the new task data by natural language processing to produce transformed new task data;
   representing, by the computing device, the new task as a vector in a vector space based on the transformed new task data, wherein the vector space includes representations of completed tasks, and the completed tasks are associated with respective participants;
   calculating, by the computing device, distances between the new task and the respective completed tasks represented in the vector space;
   ranking, by the computing device, the respective participants based on the distances between the new task and the completed tasks associated with respective participants;
   determining, by the computing device, a select participant of the respective participants to be assigned to the new task based on the ranking; and
   initiating, by the computing device, automatic assignment of the new task to the select participant.

2. The computer-implemented method of claim 1, further comprising storing, by the computing device, the new task in a database with the calculated distances.

3. The computer-implemented method of claim 1, wherein the natural language processing comprises one or more natural language processing techniques selected from the group consisting of: tokenization; part-of-speech (PoS) tagging; lemmatization; stop words removal; n-gram computation for n from 1 to 4; and frequency-inverse document frequency (TFIDF) transformation.

4. The computer-implemented method of claim 1, wherein the distance is calculated using a cosine distance function, and wherein the select participant is, on average, associated with completed tasks most similar to the new task compared with other ones of the respective participants.

5. The computer-implemented method of claim 1, wherein a service provider at least one of creates, maintains, deploys and supports the computing device.

6. The computer-implemented method of claim 1, wherein the receiving, transforming, representing, calculating, ranking, determining, and initiating, are provided by a service provider on a subscription, advertising, and/or fee basis.

7. The computer-implemented method of claim 1, wherein the computing device includes software provided as a service in a cloud environment.

8. A computer program product, the computer program product comprising a non-transitory computer readable storage medium having program instructions embodied therewith, the program instructions executable by a computing device to cause the computing device to:
   receive new task data for a new task posted to a remote cooperative development server, via a network;
   transform the new task data utilizing natural language processing to produce transformed new task data;
   represent the new task as a vector in a vector space based on the transformed new task data, wherein the vector space includes representations of completed tasks, and the completed tasks are associated with respective participants;
   calculate similarities between the new task and the respective completed tasks represented in the vector space;
   rank the respective participants based on the similarities between the new task and the completed tasks associated with respective participants and a predetermined function;
   determine a select participant of the respective participants to be assigned to the new task based on the ranking; and
   initiate automatic assignment of the new task to the select participant.

9. The computer program product of claim 8, wherein the natural language processing comprises: tokenization; part-of-speech (PoS) tagging; lemmatization; stop words removal; n-gram computation for n from 1 to 4; and frequency-inverse document frequency (TFIDF) transformation.

10. The computer program product of claim 8, wherein:
    the similarity is calculated using a cosine distance function;
    the predetermined function is an averaging function; and
    the select participant is, on average, associated with completed tasks most similar to the new task compared with other ones of the respective participants.

11. The computer program product of claim 8, wherein the new task data comprises a task item number, a task title and a task description.

12. The computer program product of claim 8, wherein the receiving the new task data comprises obtaining, by an application programming interface (API) of the computing device, the new task data automatically based on a webhook setting of the cooperative development platform.

13. The computer program product of claim 8, wherein the program instructions further cause the computing device to obtain a number of open tasks currently assigned to each of the respective participants from the cooperative development platform, wherein the ranking the respective participants is further based on the number of open tasks currently assigned to each of the respective participants.

14. A system comprising:
a processor, a computer readable memory, and a computer readable storage medium;
program instructions to automatically receive new task data for a new task posted to a remote cooperative development server, via a network;
program instructions to transform the new task data utilizing natural language processing to produce transformed new task data;
program instructions to represent the new task as a vector in a vector space based on the transformed new task data, wherein the vector space includes representations of completed tasks, and the completed tasks are associated with respective participants;
program instructions to obtain a number of open tasks assigned to the respective participants from the cooperative development server via the network;
program instructions to calculate similarities between the new task and the respective completed tasks represented in the vector space;
program instructions to rank the respective participants based on the similarities between the new task and the completed tasks associated with respective participants and the number of open tasks assigned to the respective participants;
program instructions to determine a select participant of the respective participants to be assigned to the new task based on the ranking; and
program instructions to initiate automatic assignment of the new task to the select participant,
wherein the program instructions are stored on the computer readable storage medium for execution by the processor via the computer readable memory.

15. The system of claim 14, wherein the natural language processing comprises: tokenization; part-of-speech (PoS) tagging; lemmatization; stop words removal; n-gram computation for n from 1 to 4; and frequency-inverse document frequency (TFIDF) transformation.

16. The system of claim 14, wherein the similarity is calculated using a cosine distance function.

17. The system of claim 16, wherein the ranking the respective participants is further based on an averaging function; and the select participant is, on average, associated with completed tasks most similar to the new task compared with other ones of the respective participants.

18. The system of claim 14, wherein the new task data comprises a task item number, a task title and a task description.

19. The system of claim 14, wherein the receiving the new task data comprises obtaining, by an application programming interface (API) of the computing device, the new task data automatically based on a webhook setting of the cooperative development platform.

20. The system of claim 14, further comprising obtaining and transforming completed task data of the completed tasks using natural language processing, wherein the natural language processing comprises: tokenization; part-of-speech (PoS) tagging; lemmatization; stop words removal; n-gram computation for n from 1 to 4; and frequency-inverse document frequency (TFIDF) transformation; and wherein the completed tasks are represented in the vector space based on the transformed completed task data.

* * * * *